Oct. 6, 1959 — A. SCHIKS — 2,907,257

SETTING DEVICE FOR PHOTOGRAPHIC OBJECTIVES

Filed Feb. 28, 1955

INVENTOR:
Albert Schiks

BY Richards & Geier

ATTORNEYS

2,907,257

SETTING DEVICE FOR PHOTOGRAPHIC OBJECTIVES

Albart Schiks, Munich-Obermenzing, Germany, assignor to Opt. Werke C.A. Steinheil Sohne G.m.b.H., Munich, Germany, a firm Application February 28, 1955, Serial No. 491,099

Claims priority, application Germany March 4, 1954

1 Claim. (Cl. 95—64)

This invention relates to photographic objectives and refers, more particularly, to a diaphragm setting device for use in photographic objectives.

An object of the present invention is the provision of a diaphragm setting device which is particularly adaptable for use in conjunction with photographic objectives of long focal length.

Another object is the provision of a diaphragm setting device which is simple in construction and most effective in operation, and which is compact in structure.

Other objects of the present invention will become apparent in the course of the following specification.

In accomplishing the objects of the present invention, it was found desirable to provide a transmission shaft which is located entirely within the objective and is located parallel to the axis of the objective close to the adjusting means for the objective; the shaft is provided with two gear wheels, one of which meshes with a member which actuates the diaphragm, said gear remaining in this engagement during the setting of the diaphragm. The second gear is mounted upon that end of the shaft which is closest to the camera and remains in meshing engagement with a third gear wheel while the worm drive of the objective is being actuated. This third gear wheel is driven by means of an actuating device, such as a press button, a press lever, or the like, which also serves to operate the release of the camera. According to a further feature of the inventive idea, the above mentioned second and third gear wheels along with the actuating device can be constructed as a transmission gear, so that, by way of example, when the actuating element is swung only to the extent of about 16° the part which serves to diminish the diaphragm opening will be turned to the extent of about 80°.

It is also of advantage to mount the second gear wheel, as well as the third gear wheel, firmly upon their respective shafts and to make the last one of these gear wheels so long that the two gear wheels will remain in engagement while the worm drive is being reciprocated. A particularly effective embodiment of the inventive idea consists in that the actuating device, for example, the actuating lever, is made swingable by means of a button or the like about an axis which extends parallel to the objective axis, and that in the course of the actuation a fourth gear wheel which has the form of a gear segment and which is connected by means of a spring with the actuating device is turned only until it reaches a position corresponding to the diaphragm opening which was previously set by means of a setting ring, whereupon the actuating device continues to move further against the action of the spring until it operates the shutter release.

The invention will appear more clearly from the following detailed description when taken in connection with the accompanying drawing showing by way of example a preferred embodiment of the inventive idea.

Figure 1:
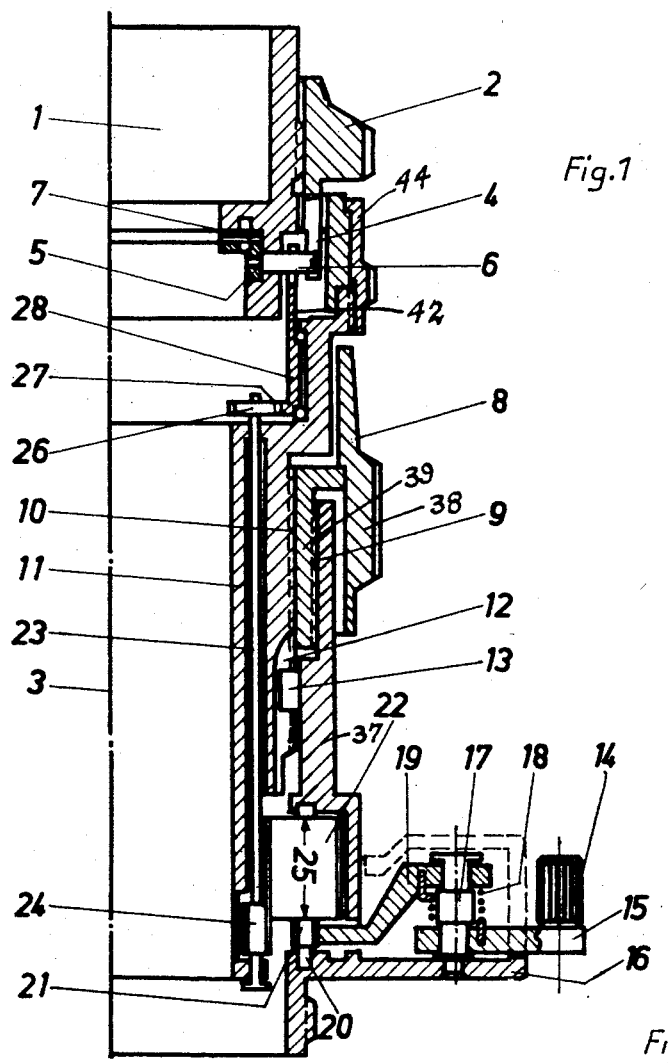
Figure 1 is a longitudinal section through one-half of a device constructed in accordance with the principles of the present invention, the section being through the objective axis.
Figure 3:
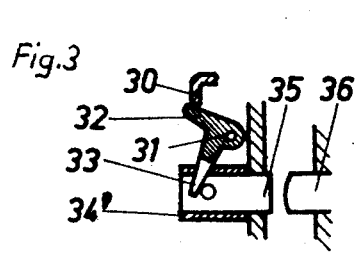
Figure 3 shows the release device in section as it is being operated by the actuating device.

To the camera body 16 there is secured the housing 37 which has an interior thread in its outer end. A focussing ring 38 is attached to an intermediate threaded member 39 which has both an exterior thread 9 engaging the thread in the housing 37 and an interior thread 10 which engages an exterior thread upon the objective carrier 11. A lug 13 upon the inner surface of the housing 37 projects into a slot 12 in the objective carrier 11 running parallel with the axis of the carrier, and so prevents the carrier turning.

In the other end of the objective carrier 11 is secured, for example, by a nut 41, the objective 1, the lenses of which are not shown. Within the objective is an iris diaphragm consisting of overlapping laminations 7 engaged with a ring 5 by the turning of which the overlap may be varied to alter the aperture of the diaphragm. Upon the objective 1 there rotates a ring 2 which serves to pre-set the desired aperture. It carries an abutment 4 which lies in the path of some part of the movable portion of the diaphragm—in the example shown it lies in the path of a pin 6 projecting from the ring 5.

An exposure is made by pressure upon a stud or button 14 shown as projecting from a shutter release lever 15 which turns on a pivot 17 set in the bracket 16 projecting from the housing; upon the same pivot 17 there turns a toothed segment 19 which is connected to the lever 15 by a spring 18. The segment 19 meshes with a pinion 21 secured upon a shaft 20, rotatably mounted in the housing 37. The same thread carries a pinion 22 of an exceptional width 25. Within the objective carrier there is mounted a transmission shaft 23 which carries at one end a pinion 24 meshing with the pinion 25 and at the other end a pinion 26 meshing with internal teeth 27 upon a ring 28 mounted in ball bearings in the objective carrier. The ring 28 has an outwardly projecting forked lug 42, its forked end embracing the pin 6.

It is plain that focussing by the action of the threads 9 and 10 must result in the pinion 26 varying its distance from the bracket 16. In order that the transmission may be unaffected by the focussing adjustment the pinions 22, 24 are made of such width that they remain in mesh in all positions of the carrier 11.

The shutter release lever 15 has a lug 30 projecting from it which as the lever turns engages a bell crank lever 32 rocking upon a pivot 31. The end 33 of the lever 32 is forked and engages studs 34 projecting from a block 35 sliding in a guide 34'. After certain lost motion the block 35 encounters the trigger 36 of the shutter and the shutter is operated.

The operation of the device is as follows:

The user turns the setting ring 2 about the axis 3 to a position wherein the stop 4 constitutes a stop for the pin 6 carried by the iris ring 5. The user then operates the range setting ring 8, whereby due to the rotation of the part 39, the objective carrier 11 is moved in and out, being held from rotation on the camera body by means of the projection 13. After the user has set the desired shutter opening by actuating the setting ring 2, he can press the button 14 and thereby cause the arm 15 to swing about the pivot 17. Since the gear segment 19 is connected with the arm 15 by the spring 18, the gear segment 19 will be turned and will rotate the gear 21 which is meshing therewith. The gear 22 which is firmly connected with the gear 21 will also be rotated.

Figure 2:
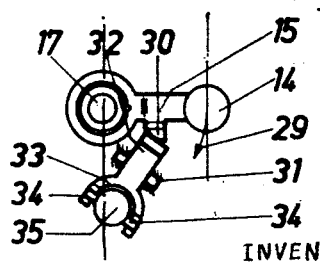
Figure 2 is a detailed top view illustrating the release device.

As already stated, the gear 22 is sufficiently wide so that it will remain in engagement with the gear 24 in all positions of the objective carrier 11. Thus, the rotation of the gear wheel 22 will be transmitted to the gear wheel 24 which is in engagement therewith and then through the shaft 23 to the gear wheel 26. The gear wheel 26 will rotate the sleeve 28, since it is meshing with the crown 27 forming a part of the sleeve 28. Since the sleeve 28 has a fork-like projection 42 engaging the pin 6, the rotation of the sleeve 28 will cause a corresponding movement of the iris ring 5 and, consequently, of the diaphragm elements 7. In the course of this movement the pin 6 firmly connected with the ring 5 will strike the stop 4 set by a setting ring 2 for the shutter opening. Then, in the course of a further turning of the lever 15 the gears 19, 21, 22 and 24, the shaft 23, the gear 26, the sleeve 28, the pin 6, and the iris ring 5 will be locked and will not be able to turn any more. The lever 15 will now move further against the action of the spring 18 without moving the gear segment 19. In the course of this movement, which is indicated by the arrow 29 in Figure 2, the projection 30 carried by the lever 15 will press against the lever 32 so that the lever 32 will swing about its axis 31 counterclockwise.

The fork-shaped ends 33 of the lever 31 will engage the ends of the pin 34 and will press downwardly the pin 35 which carries the pin 34. The turning movement of the lever 32 continues until the pin 35 strikes the button 36 of the shutter release. The shutter release 36 will be then operated in the usual manner.

A spring, which is not shown in the drawing, may be provided upon the outer side of the lever 15 and may be used to bring the entire mechanism back to its original position, in which the shutters are open after the photographic picture has been taken.

It is apparent that the example shown above has been given solely by way of illustration and not by way of limitation and that it is subject to variations and modifications within the scope of the present invention; for example, since the objective head is removable, it may be used for other purposes, for example, with a bellows device. All such and other variations and modifications are to be included within the scope of the present invention.

What is claimed is:

In a camera having a body, an objective carrier, an objective supported by said objective carrier, a shutter, a shutter trigger actuating said shutter, and an iris diaphragm in said objective; a housing having inner screw threads and an inner lug, said objective carrier having a slot extending parallel to its axis and outer screw threads, said lug projecting into said slot, an intermediate member having inner screw threads meshing with the outer screw threads of said objective carrier and outer screw threads meshing with the inner screw threads of said housing, a focussing ring carried by said intermediate member, a ring connected with said iris diaphragm, a pin projecting from the second-mentioned ring, another ring carried by said objective and having an abutment adapted to engage said pin, a shutter release lever, a pivot mounted upon said body and carrying said shutter release lever, a toothed segment mounted upon said pivot, a spring connecting said shutter release lever with said toothed segment, a shaft rotatably mounted in said housing, a pinion keyed upon said shaft and meshing with said toothed segment, another pinion keyed upon said shaft, an elongated transmission shaft mounted in said objective carrier and extending parallel to its axis, a third pinion keyed upon one end of the last-mentioned shaft and meshing with said other pinion, a fourth pinion keyed upon the other end of the last-mentioned shaft, a ring mounted in said objective carrier and having inner teeth meshing with said fourth pinion, a lug carried by the last-mentioned ring and engaging said pin, whereby the focusing of the camera by the action of the inner and outer screw threads of said intermediate member causes a relative axial movement between said other pinion and said third pinion, said other pinion and said third pinion being axially elongated and remaining in meshing engagement during said relative axial movement, another lug carried by said shutter release lever, a rockable bell crank lever adapted to be engaged by said other lug, a slidable block adapted to engage and actuate said shutter trigger, and studs carried by said block and engaged by said bell crank lever.

References Cited in the file of this patent

UNITED STATES PATENTS

| | | |
|---|---|---|
| 2,113,318 | Crumrine | Apr. 5, 1938 |
| 2,343,206 | Rath | Feb. 29, 1944 |
| 2,371,524 | Kals | Mar. 13, 1945 |
| 2,464,559 | Davenport et al. | Mar. 15, 1949 |
| 2,652,756 | Willcox | Sept. 22, 1953 |
| 2,777,371 | Schutz | Jan. 15, 1957 |

FOREIGN PATENTS

| | | |
|---|---|---|
| 1,003,952 | France | Nov. 24, 1949 |